(12) United States Patent
Grimal et al.

(10) Patent No.: US 7,527,868 B2
(45) Date of Patent: May 5, 2009

(54) TRANSPARENT SUBSTRATE COATED WITH AT LEAST ONE THIN LAYER

(75) Inventors: Jean-Michel Grimal, Poissy (FR); Frédéric Barrieres, Saint-Ouen (FR)

(73) Assignee: Saint-Gobain Vitrage, Courbevoie (FR)

( * ) Notice: Subject to any disclaimer, the term of this patent is extended or adjusted under 35 U.S.C. 154(b) by 357 days.

(21) Appl. No.: 10/354,081

(22) Filed: Jan. 30, 2003

(65) Prior Publication Data
US 2003/0235719 A1   Dec. 25, 2003

Related U.S. Application Data

(63) Continuation of application No. 09/269,077, filed as application No. PCT/FR98/01598 on Jul. 21, 1998, now abandoned.

(30) Foreign Application Priority Data
Jul. 21, 1997   (FR) .................................. 97 09223

(51) Int. Cl.
    *B32B 17/06* (2006.01)
(52) U.S. Cl. ................... 428/432; 428/698; 428/697; 428/701; 428/702
(58) Field of Classification Search .................. 428/336, 428/432, 433, 434, 469, 698, 697, 472, 701, 428/702, 446, 699
See application file for complete search history.

(56) References Cited

U.S. PATENT DOCUMENTS

| | | | |
|---|---|---|---|
| 4,528,244 A | 7/1985 | Winkelbauer et al. | |
| 4,715,879 A | 12/1987 | Schmitte et al. | |
| 4,749,397 A | 6/1988 | Chesworth et al. | |
| 4,806,220 A | 2/1989 | Finley | |
| 5,376,455 A * | 12/1994 | Hartig et al. | 428/428 |
| 5,411,794 A * | 5/1995 | Kawaguchi et al. | 428/216 |
| 5,417,827 A | 5/1995 | Finley | |
| 5,543,229 A | 8/1996 | Ohsaki et al. | |
| 5,563,734 A | 10/1996 | Wolfe et al. | |
| 5,705,278 A | 1/1998 | Gillery et al. | |
| 5,709,930 A * | 1/1998 | DePauw | 428/216 |
| 5,776,603 A | 7/1998 | Zagdoun et al. | |
| 5,834,103 A | 11/1998 | Bond et al. | |
| 5,935,702 A | 8/1999 | Macquart et al. | |
| 6,045,896 A * | 4/2000 | Boire et al. | 428/216 |

FOREIGN PATENT DOCUMENTS

DE   297 02 816   4/1997

(Continued)

OTHER PUBLICATIONS

Chemical Abstracts, vol. 114, No. 18, May 6, 1991, abstract No. 169829k, p. 346; & JP 02 233534, Sep. 17, 1990.

*Primary Examiner*—Timothy M Speer
(74) *Attorney, Agent, or Firm*—Oblon, Spivak, McClelland, Maier & Neustadt, P.C.

(57) ABSTRACT

A transparent glass substrate (1, 1', 1") coated with one or more thin layers (6, 16, 28) is disclosed, wherein the thin layer most distant from the glass substrate is a composition comprising silicon nitride, carbonitride, oxynitride or oxycarbonitride, said thin layer most distant from the glass substrate being covered by a second layer (7, 17) which protects against high-temperature corrosion.

19 Claims, 2 Drawing Sheets

FOREIGN PATENT DOCUMENTS

| | | |
|---|---|---|
| EP | 0 536 607 | 4/1993 |
| EP | 0 622 645 | 11/1994 |
| EP | 0 712 815 | 5/1996 |
| JP | 62-158139 | 7/1987 |
| JP | 62-235232 | 10/1987 |
| JP | 05-195201 | 8/1993 |
| JP | 05-213632 | 8/1993 |
| JP | 08-238710 | 9/1996 |
| JP | 08-336923 | 12/1996 |

* cited by examiner

TRANSPARENT SUBSTRATE COATED WITH AT LEAST ONE THIN LAYER

Related Applications

This is a continuation of pending U.S. Application Ser. No. 09/269,077 filed Nov. 19, 1999, which is a §371 national stage entry of PCT/FR98/01598 filed Jul. 21, 1998, and claims priority to foreign application FR97/09223 filed Jul. 21, 1997.

The invention relates to transparent substrates, especially glass substrates, that are provided with at least one thin layer.

The main application of the invention is the manufacture of so-called functional windows used in the building industry or for equipping vehicles. Hereafter, "functional" window should be understood to mean a window in which at least one of the substrates is coated with thin layers intended to give it special properties, especially thermal, electrical, optical or even mechanical properties, such as a scratch-resistant property for example.

The thin layers of greatest interest in the invention are those intended to confer thermal properties, i.e. those which can act, especially, by reflecting long-wavelength infrared and/or solar radiation.

Thus, so-called low-emissivity layers are known, especially thin silver layers, or layers of a doped metal oxide of the $F:SnO_2$ or ITO type, filtering layers having a solar-protection function, for example those based on metal layers of the nickel-chromium-alloy type, thicker silver layers or TiN-type metal nitride layers.

Stacks may provide one or more of these layers which will be denoted below by the term "functional layers". These layers are usually combined with other layers to form a stack, for various reasons.

Thus, it is usually intended to combine them with at least one coating of dielectric material, which coating(s) lies(lie) above the functional layer and/or are inserted between the carrier substrate and the functional layer. This is firstly for optical reasons: these coatings, chosen so as to have an appropriate refractive index and thickness, allow the visual appearance of the window, especially in reflection, to be adjusted in an interferential manner. Furthermore, above the functional layer, they may also provide protection from chemical or mechanical attack. Mention. may also be made of Patents EP-544,577, EP-573,325 and EP-648,196 which describe stacks using an $F:SnO_2$-type functional layer combined with another layer of a dielectric layer of the $SiO_2$, SiOC or SiON type, Patents EP-638,528, EP-745,569 and EP-678,484 which describe stacks using one or more silver layers alternating with one or more layers of a dielectric of the metal-oxide type, or Patent EP-650,938 which use a TiN-based layer combined with two oxide layers or patent EP-511,901 which uses a layer of the nitrided nickel-chromium type between two particular metal oxides.

More recently, it has also been sought to provide these layers of dielectric material with the function of protecting the functional layers during high-temperature heat treatments, of the. bending/toughening type, of their glass substrates. Materials based on silicon nitride have come to be very useful, especially from this point of view: optically, they have a refractive index close to 2 and therefore similar to those of most of the metal oxides normally used as dielectric layers, for example of the $SnO_2$ type. However, they also act as a barrier to atmospheric oxygen with respect to the functional layer, thus preserving it from any deterioration of the high-temperature oxidation type. Furthermore, they are "inert" with respect to oxygen at high temperature in the sense that their properties, especially their optical properties, remain unchanged after a heat treatment of the bending/toughening type. Thus, it is possible to design stacks in which the functional layer is covered by an $Si_3N_4$ layer optionally combined with other layers, with thermal and optical properties which remain identical after bending/toughening: this is the teaching, for example, of patent EP-0,718,250 which describes stacks of the glass/oxide layer(s)/silver/metal/oxide layer(s) / $Si_3N_4$ type, the outermost layer being made of $Si_3N_4$.

However, it has proved to be the case that even with this type of stack, industrial yields were not optimal in the sense that still too high a number of coated substrates had to be scrapped, once they had been bent or toughened, because of the appearance of pinhole-type optical defects visible to the naked eye.

The object of the invention is therefore to overcome this drawback, especially by providing a novel type of stack comprising a functional layer or layers which can undergo heat treatments, while exhibiting better optical quality, or at the very least optical quality which is more reproducible and more controlled.

The subject of the invention is a transparent substrate of the glass substrate type coated with a thin layer based on silicon nitride, carbonitride, oxynitride and/or oxycarbonitride (hereafter denoted by the term "silicon nitride layer") or with a stack of thin layers, the last of which is this silicon nitride layer. In order to prevent deterioration of this layer during heat treatments of the bending or toughening type, especially in contact with an atmosphere containing corrosive species of the $Na_2O$ type and, optionally, chlorides or sulphides, it is covered by a layer which protects against this type of high-temperature corrosion and/or is "doped" by introducing at least one metal into its composition. (The term "doped" should not be taken here in its sense known in electronics, rather it indicates that the nitride layer exhibits properties, most particularly properties of resistance to high-temperature corrosion, which are enhanced by the presence of this (these) metallic additive(s).

In fact, it has turned out that the silicon nitride layer completely fulfilled its role of protecting the subjacent layers from high-temperature oxidation. However, on the other hand, under certain conditions encountered in heat treatments of the toughening type, but above all of the bending type, this silicon nitride layer could be susceptible to deterioration not by oxidizing attack but rather by attack from chemical species present in the atmosphere in which the bending operation is carried out and are "aggressive" at high temperature and/or which "migrate" from the second glass substrate in the case in which the bending of several of these glass substrates is carried out simultaneously, the substrates being superposed on a ring mould with the multilayer stack of one of the substrates in contact with the other glass substrate. At least one type of these species has been identified: these are all alkali metal compounds of the sodium type, especially $Na_2O$ vapour. This high-temperature sensitivity has hitherto resulted in the pinholes mentioned above, surface attack of the silicon nitride propagating into the rest of the stack.

The invention has therefore consisted in keeping silicon nitride for its, very useful oxygen-barrier properties but improving its high-temperature durability by two combined or alternative means:

according to the first variant, it is "sheathed" by a protective layer which is not intended to block oxygen but which will block the Na2O-type corrosive species, by forming a perfectly impermeable barrier either by being chemically inert with respect to these corrosive species or by having a good affinity with them so as to filter them out by absorbing them;

according to the second variant, the nitride is chemically modified in order to make it more resistant but without, however, making it lose its oxygen-barrier properties.

This highly effective approach makes it possible for the scrap rate when bending the glass substrate to be very significantly reduced, by considerably limiting the appearance of the optical defects observed hitherto. This approach is completely unexpected in that silicon nitride is normally regarded as quite a durable material from a mechanical standpoint, and chemically rather inert. It might have been expected that the origin of the optical defects detected in the stack would be the layers which do not have such a degree of durability and are subjacent to the silicon nitride layer, for example the functional layers or the first layer of the stack, the one in direct contact with glass. On the contrary, the inventors have therefore shown that corrosion propagated via the final nitride layer.

The invention allows a compromise to be made, namely to keep silicon nitride despite this demonstrable weakness, by improving it.

According to the first variant, the silicon nitride is therefore protected by an overlayer.

In a first embodiment, this overlayer is placed on the silicon nitride layer (preferably directly but optionally via at least one other layer of the dielectric type) either in the form of a metal or in the form of a metal oxide which is substoichiometric in terms of oxygen. This layer is intended to be completely oxidized during the heat treatment. During the deposition, before the treatment, it preferably has a geometrical thickness of at most 10 nm, especially of between 1 and 5 nm. In fact, there will be oxidation, and therefore modification of the optical properties of the stack after heat treatment, essentially resulting in an increase in the light transmission. However, these modifications are not of extreme importance since the protective layer is preferably confined within very small thicknesses, although these are sufficient to fulfil its function. They are, in any case, under complete control since the properties of the protective layer are chosen so that it completely oxidizes during the heat treatment.

According to the second embodiment of this first variant, the protective layer is deposited on top of the silicon nitride layer (directly or indirectly, as in the previous embodiment) in the form of a metal oxide, oxycarbide and/or oxynitride, especially to a geometrical thickness of at most 20 nm, especially of between 2 nm and 10 nm. According to this second embodiment, no modification in the properties, especially the optical properties of the stack is observed after heat treatment.

The protective layer, which may or may not undergo oxidation during the heat treatment, comprises at least one metal whose oxide is capable of blocking/absorbing/filtering the species corrosive at high temperature other than oxygen, especially of the $Na_2O$ type. This metal is preferably chosen from niobium Nb, tin Sn, tantalum Ta, titanium Ti and zirconium Zr. Niobium is particularly advantageous, its oxide having a high affinity with alkali metals of the sodium type.

According to the second variant of the invention, the silicon nitride layer is "doped" by introducing up to 25% by weight, especially between 3 and 12% by weight, of at least one metal. This metal is preferably aluminium.

The silicon-nitride-based layer may advantageously form part of a thin-layer stack and may especially be in the stack above a functional layer having thermal properties, directly or via at least one other thin dielectric or metal layer. This functional layer may in particular be a filtering, solar-protection, selective, low-emissivity and/or electrically conductive layer.

The stack may comprise one or more functional layers, which may or may not be of the same nature, for example two or three functional layers.

The functional layer may be of the metallic type, especially one based on silver, gold, aluminium, nickel, chromium, optionally, a nitride, or stainless steel. It is possible to have not a single functional layer, but at least two functional layers separated by at least one dielectric coating.

These functional layers, their thicknesses and their optical performance characteristics are especially described in the aforementioned patents. Mention may more particularly be made to the above Patent EP-0,718,250 which uses one or more silver layers in a stack which is completed by a silicon nitride layer merely to give the stack "bendability"/"toughenability". Mention may also be more particularly made of Patent Application EP-0,847,965 which discloses stacks of the type having two silver layers, these being designed for the purpose of improving their bendability or toughenability, and also making use of at least one silicon nitride layer: the invention allows the quality of the stacks described in these two patents to be further improved.

Thus, we have stacks which are, diagrammatically, of the type: silver layer placed, on the one hand, between an "inner" dielectric coating (on the carrier substrate side) and, on the other hand, and "outer" dielectric layer preferably via a thin metal layer, the said "outer" dielectric coating comprising the improved silicon nitride layer according to the invention. In the case of a stack consisting of two silver layers alternating with three dielectric coatings, at least the dielectric layer "outermost" with respect to the carrier substrate is completed by the improved silicon nitride layer according to the invention.

The functional layer may also be of the metal-nitride type, especially one based on TiN, CrN, NbN or ZrN.

The functional layer may also be of the doped-metal-oxide type, such as ITO, $F:SnO_2$, In:ZnO, F:ZnO, Al:ZnO or Sn:ZnO.

The invention preferably relates to thin layers deposited by vacuum techniques, especially the technique of sputtering, optionally enhanced by a magnetic field. This is a well-controlled technique for depositing metal or metal oxide layers or metal nitride or silicon nitride layers. In the latter case, metal or silicon targets are used in suitable reactive atmospheres with gases of the $O_2$ or $N_2$ type. The invention also relates to thin layers deposited by other techniques, especially those of the type comprising pyrolysis directly on the ribbon of float glass, pyrolysis of a powder or CVD (Chemical Vapour Deposition), these techniques being suitable for depositing optionally doped metal oxide layers, for depositing metal nitride layers, as described in Patent EP-638,527 and EP-650,938, and for depositing layers based on silicon nitride optionally also comprising oxygen and/or carbon, as described in Patent Application FR 97/01468 of 10 Feb. 1997.

The invention also relates to stacks of thin layers, some of which layers, for example, the first layers, may be deposited by pyrolysis, and others, especially the next layers, using a vacuum technique, in a subsequent operation.

The subject of the invention is also the application of the substrate coated according to the invention to the manufacture of windows which exploit the electrical properties of the functional layer(s) of the stack as heated windows, as well as its application to the manufacture of windows having the above-mentioned thermal properties, which windows are furthermore bendable/toughenable.

The invention relates to the use of these windows both in the building industry and as windows for fitting into vehicles of the motor-vehicle type, these having a "monolithic" structure (a single rigid substrate), being laminated with two rigid glass substrates or being asymmetrically laminated (one glass substrate combined with at least one sheet of polymer that absorbs mechanical energy and a so-called sheet of polymer of the self-healing type, these both generally being based on polyurethane, as described for example in Patent EP-673, 757). Mention may especially be made of vehicle windscreens and side windows.

The invention is advantageous irrespective of the bending or bending/toughening technique envisaged. The following may, in a non-exhaustive manner, be mentioned:

the technique of bending glass substrates running over a curved-profile shaping bed, consisting especially of straight or curved rotating rolls, as is described in Patents EP-133,114, EP-263,030, EP-474,531 and EP-593, 363;

the technique of gravity bending, in which a glass substrate or two superposed glass substrates are placed horizontally on peripheral bending formers mounted on carriages which move through a reheat furnace, as described in Patents EP-317,409, EP-465,308, EP-640, 569 and WO 97/23420 and particularly adapted to the manufacture of laminated windows; and the technique of bending which involves a step of pressing and/or suction against an upper solid bending former associated with a lower annular bending former, as described in Patents EP-324,690, EP-438,342, EP-665, 822, EP-459,898, EP-578,542 and EP-660,809.

A toughening operation, especially a thermal toughening operation, may complete these bending operations or may replace them. In all cases, this requires reheating the glasses up to at least 500° C. and generally about 550 to 620° C., which temperatures exacerbate the corrosive effect of certain kinds of vapour of the $Na_2O$ type, from which observations the invention stems.

The invention will be described in detail below with the aid of non-limiting examples illustrated by figures.

These figures are extremely diagrammatic and do not respect the thickness proportions between the various materials shown, in order to make them easier to understand.

EXAMPLE 1

Figure 1:
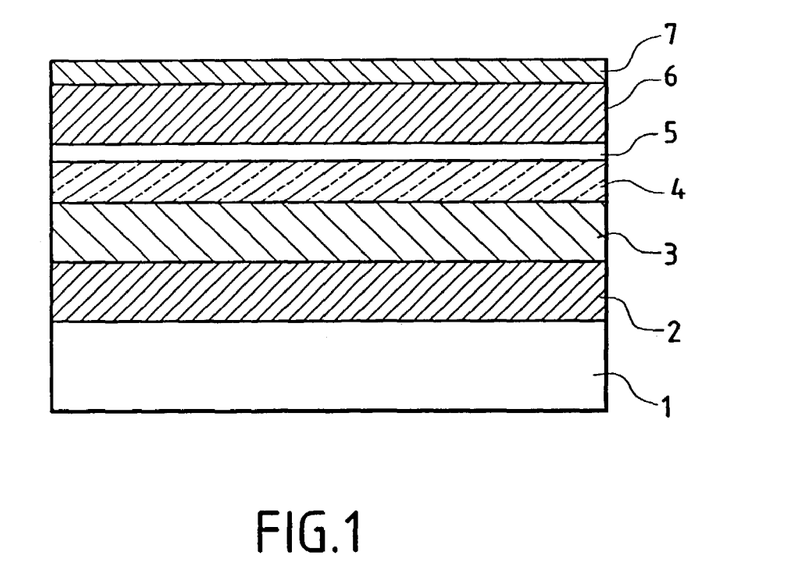
FIG. 1: a glass substrate coated with a stack of thin layers, including a silver layer.

This relates to a glass substrate 1 shown in section in FIG. 1, namely a flat 2 mm thick substrate made of silica-soda-lime float glass on which has been deposited a stack of the type described in Patent EP-0,718,250, improved according to the invention, namely the stack:

$$glass^{(1)}/Si_3N_4^{(2)}/ZnO^{(3)}/Ag^{(4)}/Nb^{(5)}/Si_3N_4^{(6)}/Nb^{(7)}$$

All the layers are deposited by sputtering.

The deposition apparatus comprises at least one sputtering chamber provided with cathodes equipped with targets made of suitable materials below which the substrate 1 passes in succession. The recommended deposition conditions for each of the layers for this example are:

the silver layer 4 is deposited using a silver target in an argon atmosphere;

the silicon-nitride-based layers 2 and 6 are deposited by reactive sputtering in a nitrogen atmosphere using a target made of silicon doped with 1% boron;

the ZnO layer 3 is deposited by reactive sputtering in an argon/oxygen atmosphere, containing approximately 40% oxygen by volume, using a zinc target;

the Nb layer 5 for protecting the silver layer is deposited by sputtering in an inert argon atmosphere, using an Nb target; and the layer 7 according to the invention, intended to protect the subjacent $Si_3N_4$ layer labelled 6, is deposited under the same conditions as the Nb layer 5.

The power densities and run speeds of the substrate are adjusted in a known manner in order to obtain the desired layer thicknesses.

Table 1 below gives the nature of the layers, and their thicknesses in nanometres, of the stack in Example 1:

TABLE 1

|  | EXAMPLE 1 |
| --- | --- |
| $Si_3N_4$ (2) | 20 |
| ZnO (3) | 20 |
| Ag (4) | 10 |
| Nb (5) | 1 |
| $Si_3N_4$ (6) | 40 |
| Nb (7) | 2 |

EXAMPLE 2

Figure 2:
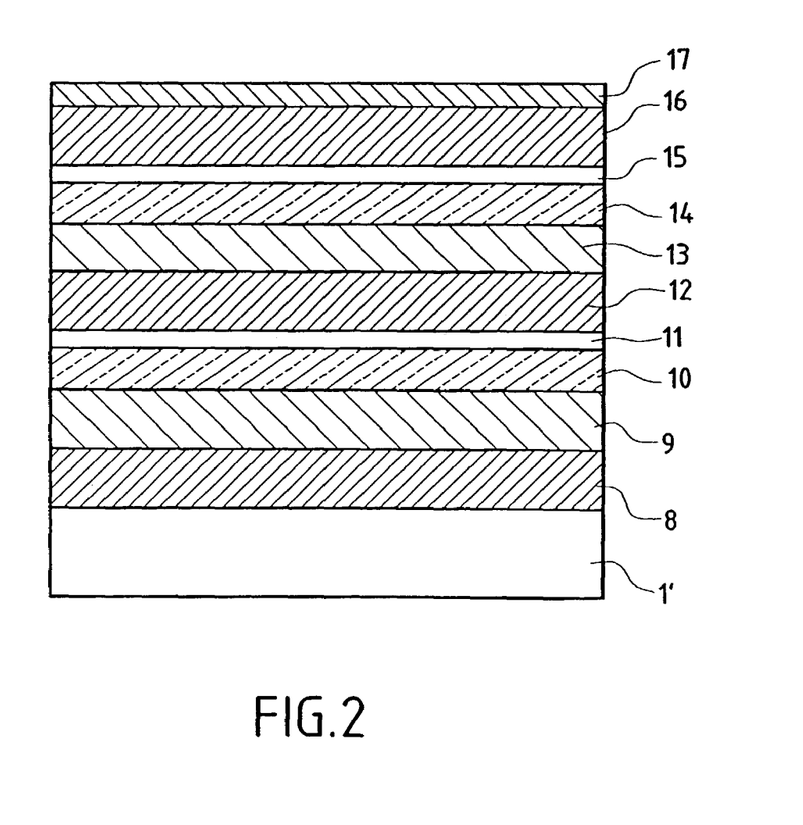
FIGS. 2 and 3: a glass substrate coated with a stack of thin layers, including two silver layers.

This relates to a glass substrate 1' shown in section in FIG. 2, this substrate being identical to the previous substrate 1, on which has been deposited a stack which includes two silver layers and may be of the type of those described in Patent EP-0,847,965 mentioned previously and improved according to the invention, namely the stack:

$$glass^{(1')}/SnO_2^{(8)}/ZnO^{(9)}/Ag^{(10)}/Nb^{(11)}/Si_3N_4^{(12)}/ZnO^{(13)}/Ag^{(14)}/Nb^{(15)}/Si_3N_4^{(16)}/Nb^{(17)}$$

The layers are deposited under the same conditions as in Example 1. In this case, the $SnO_2$ layer (8) is deposited by sputtering in a reactive atmosphere containing oxygen, using a tin target.

Table 2 below gives the nature of the layers and their thicknesses in nanometres:

TABLE 2

|  | EXAMPLE 2 |
| --- | --- |
| glass (1') | — |
| $SnO_2$ (8) | 20 |
| ZnO (9) | 17 |
| Ag (10) | 9 |
| Nb (11) | 0.7 |
| $Si_3N_4$ (12) | 65 |
| ZnO (13) | 25 |
| Ag (14) | 9 |
| Nb (15) | 0.7 |
| $Si_3N_4$ (16) | 37.5 |
| Nb (17) | 2 |

EXAMPLE 3

Figures 3, 4:
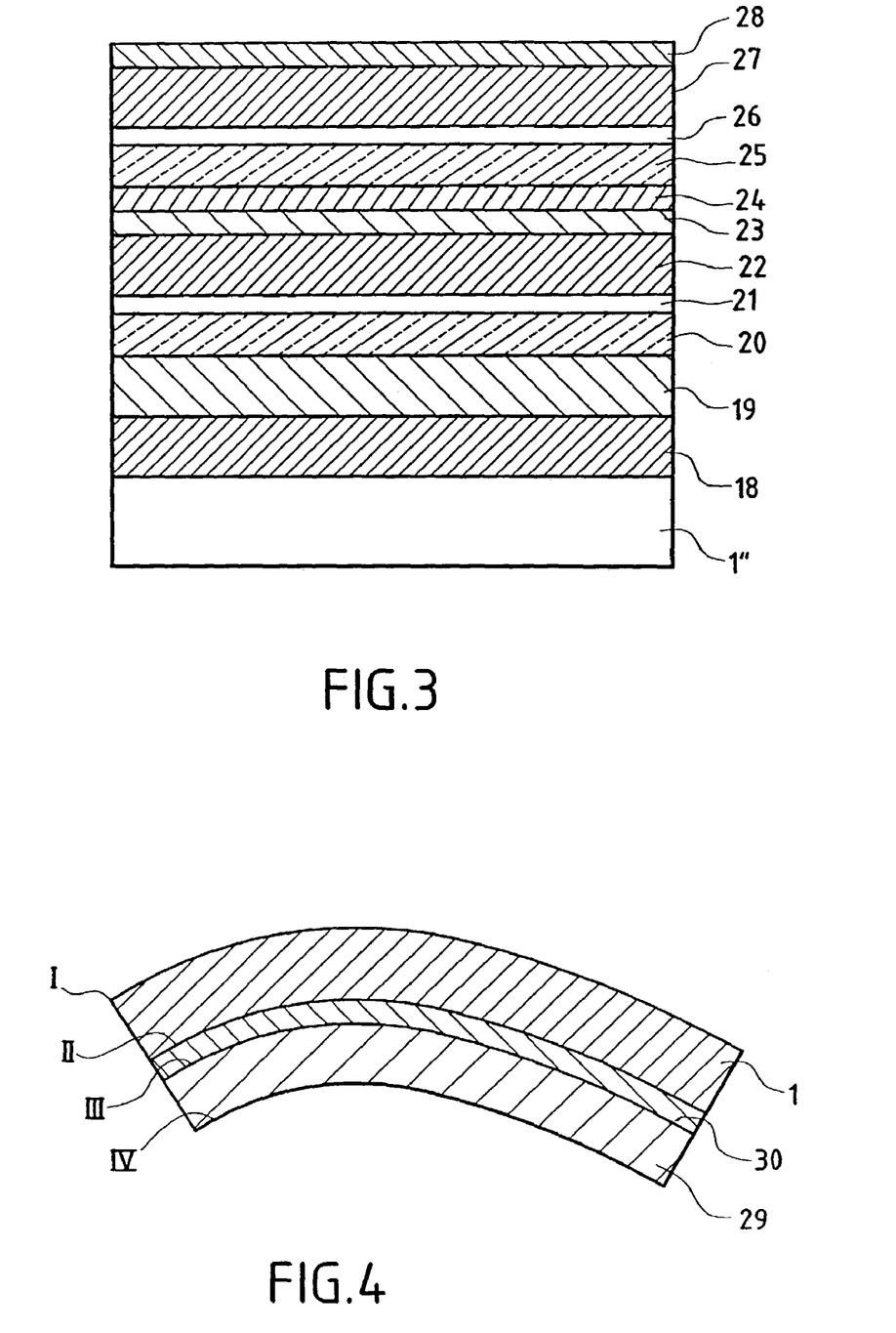
FIG. 4: a laminated window incorporating the substrate according to one of FIGS. 1, 2 and 3, once it has been bent.

This relates to a glass substrate 1" shown in section in FIG. 3, the substrate being identical to the previous substrates 1 and 1', on which has been deposited a stack which includes two silver layers and is of the type of those described in Patent EP-0,847,965 improved according to the invention.

The stack is as follows:

glass$^{(1'')}$/SnO$_2$$^{(18)}$/ZnO$^{(19)}$/Ag$^{(20)}$/Ti$^{(21)}$/ZnO$^{(22)}$/Si$_3$N$_4$ $^{(23)}$/ Zno$^{(24)}$/Ag$^{(25)}$/Ti$^{(26)}$/ZnO$^{(27)}$/Si$_3$N$_4$$^{(28)}$ doped with 7% Al The layers are deposited under the same conditions as those relating to Examples 1 and 2.

The 7% aluminium-doped Si3N4 layer (28) is deposited by reactive sputtering in a nitrogen atmosphere, using a target made of an Si/Al alloy.

Table 3 below gives the nature of the layers and their thicknesses in nanometres:

TABLE 3

|  | EXAMPLE 3 |
| --- | --- |
| glass (1'') | — |
| SnO$_2$ (18) | 17 |
| ZnO (19) | 17 |
| Ag (20) | 9 |
| Ti (21) | 1 |
| ZnO (22) | 10 |
| Si$_3$N$_4$ (23) | 55 |
| ZnO (24) | 20 |
| Ag (25) | 9 |
| Ti (26) | 1 |
| ZnO (27) | 10 |
| Si$_3$N$_4$ (28) doped with 7% Al | 25 |

Each of the three coated substrates according to Examples 1, 2 and 3 then undergoes gravity bending in a ring mould mounted on a movable carriage, which moves through a reheat furnace. Superposed on it, in the ring mould, is a second glass substrate 29 which is identical to the substrates 1, 1' and 1" but not coated with layers. The stack of layers is on the upper face of the substrate 1, 1' or 1", and is therefore in contact with the lower face of the second substrate ("in contact" does not necessarily mean in continuous contact, it being possible for there to be air trapped at the interface between the two substrates). Once the bending operation has been carried out, the stack of layers therefore is on the concave face of the first substrate 1, 1' or 1". The two superposed substrates are then separated and then, again in a known manner, joined together via an approximately 0.8 mm thick sheet 30 of polyvinyl butyral in order to form a laminated window, shown in FIG. 4, which can be used as a windscreen.

Conventionally, the faces of the glass substrates 1 and 29 are numbered starting from the face that is intended to face the outside once it has been fitted into the vehicle. In this case, we have a concave, face 2 multilayer stack.

Alternatively, the stack in the laminate may also advantageously be a face 3 stack on a concave face. In this case, the bending operation is carried out so that it is the substrate 1, 1' with the layers which is in the ring mould on top of the layer-free substrate 29, with the multilayer stack in contact with the upper face of the layer-free substrate 29.

The substrates of Examples 1, 2 and 3 were examined before and after bending and then after laminating.

The conclusions are as follows:

after bending, the light transmission of the substrates 1 and 1' increases, which means that the final Nb protective layer "encapsulating" the subjacent Si$_3$N$_4$ layer has completely oxidized;

compared with substrates which do not contain this final Nb layer, the optical quality is superior, pinholes no longer, or almost no longer, appear and the thermal performance is also maintained;

the light transmission of the substrate 1' does not change; and the laminated windows obtained meet all the required criteria for being used as a windscreen.

It should be noted that, as an alternative to the final Nb layer, it is also possible within the scope of the invention to deposit a thin layer of tin, zirconium or titanium (or to deposit Nb$_2$O$_5$, SnO$_2$, ZrO$_2$ or TiO$_2$ layers directly). These metals, most especially Nb, Sn and Ti, all have, in fact, the common property of forming, by oxidizing, a compound with sodium so as to limit its diffusion into the subjacent layers.

The invention claimed is:

1. A transparent glass substrate (1, 1', 1") coated with one or more thin layers (6, 16, 28) wherein the thin layer most distant from the glass substrate is a composition comprising silicon nitride, carbonitride, oxynitride or oxycarbonitride, said thin layer most distant from the glass substrate being covered by a second layer (7, 17) which protects against high-temperature corrosion, wherein the second layer comprises one of the following: (a) a mixture of Ti and at least one metal other than Ti whose oxide is capable of blocking or absorbing corrosive species comprising Na$_2$O at high temperature; and (b) a metal or metal oxide which is substoichiometric in terms of oxygen, wherein the second layer comprising (a), if present, has a thickness of 2-20 nm and the second layer comprising (b), if present, has a thickness of 1-10 nm.

2. The substrate according to claim 1, wherein the second layer has a thickness of at most 10 nm.

3. The substrate according to claim 2, wherein the second layer comprises a metal or metal oxide which is substoichiometric in terms of oxygen and has a thickness of between 1 and 5 nm.

4. The substrate according to claim 1, wherein the composition comprises silicon nitride and forms part of a stack of thin layers and is deposited on top of at least one functional layer (4, 10, 14, 20 and 25) having thermal properties or having electrically-conductive properties.

5. The substrate according to claim 4, wherein said functional layer (4, 10, 14, 20, 25) comprises a metal.

6. The substrate according to claim 5, wherein the substrate is provided with a stack of thin layers comprising at least one silver-based layer (4) deposited between an inner dielectric coating (2, 3) and an outer dielectric coating (6) wherein said outer dielectric coating comprises the silicon nitride layer (6).

7. The substrate according to claim 5, wherein the metal is selected from the group consisting of silver, gold, aluminum, nickel, chromium, stainless steel, and mixtures thereof.

8. The substrate according to claim 4, wherein said functional layer (4, 10, 14, 20, 25) comprises a metal-nitride.

9. The substrate according to claim 8, wherein the metal-nitride is selected from the group consisting of TiN, CrN, NbN, ZrN, and mixtures thereof.

10. The substrate according to claim 4, wherein said functional layer (4, 10, 14, 20, 25) comprises a doped-metal-oxide.

11. The substrate according to claim 10, wherein the doped-metal-oxide is selected from the group consisting of ITO, F:SnO2, In:ZnO, F:ZnO, Al:ZnO, Sn:ZnO, and mixtures thereof.

12. The substrate according to claim 4, wherein the stack of thin layers comprises at least two functional layers.

13. The substrate according to claim 1, wherein the second layer is effective to protect against high-temperature corrosion to prevent deterioration of the thin layer most distant from the glass substrate during heat treatments for bending or toughening in an atmosphere containing corrosive species.

14. The substrate according to claim 1, wherein the second layer (7,17) comprises a mixture of Ti and at least one metal other than Ti whose oxide is capable of blocking or absorbing corrosive species comprising $Na_2O$ at high temperature and has a thickness of between 2 and 10 nm.

15. The substrate according to claim 1, wherein the thin layer most distant from the glass substrate is a composition consisting essentially of silicon carbonitride.

16. The substrate according to claim 1, wherein the thin layer most distant from the glass substrate is a composition consisting essentially of silicon oxynitride.

17. The substrate according to claim 1, wherein the thin layer most distant from the glass substrate is a composition consisting essentially of silicon oxycarbonitride.

18. The substrate according to claim 1, wherein the second layer comprises a mixture of Ti and at least one metal other than Ti whose oxide is capable of blocking or absorbing corrosive species comprising $Na_2O$ at high temperature.

19. The substrate according to claim 1, wherein the second layer comprises a metal or metal oxide which is substoichiometric in terms of oxygen.

* * * * *

UNITED STATES PATENT AND TRADEMARK OFFICE
CERTIFICATE OF CORRECTION

PATENT NO. : 7,527,868 B2 Page 1 of 1
APPLICATION NO. : 10/354081
DATED : May 5, 2009
INVENTOR(S) : Grimal et al.

It is certified that error appears in the above-identified patent and that said Letters Patent is hereby corrected as shown below:

On the title page, the Terminal Disclaimer information has been omitted. Item (45) and the Notice information should read as follows:

--(45) Date of Patent: * May 5, 2009

( * ) Notice:   Subject to any disclaimer, the term of this patent is extended or adjusted under 35 U.S.C. 154(b) by 357 days.

This patent is subject to a terminal disclaimer.--

Signed and Sealed this

Sixteenth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,527,868 B2  
APPLICATION NO. : 10/354081  
DATED : May 5, 2009  
INVENTOR(S) : Grimal et al.

Page 1 of 1

It is certified that error appears in the above-identified patent and that said Letters Patent is hereby corrected as shown below:

On the title page, Item (45) and the Notice information should read as follows:

--(45) **Date of Patent: * May 5, 2009**

(*) Notice: Subject to any disclaimer, the term of this patent is extended or adjusted under 35 U.S.C. 154(b) by 357 days.

This patent is subject to a terminal disclaimer.--

Signed and Sealed this

Twenty-first Day of July, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,527,868 B2 | Page 1 of 1 |
| APPLICATION NO. | : 10/354081 | |
| DATED | : May 5, 2009 | |
| INVENTOR(S) | : Grimal et al. | |

It is certified that error appears in the above-identified patent and that said Letters Patent is hereby corrected as shown below:

On the title page, the Terminal Disclaimer information has been omitted. Item (45) and the Notice information should read as follows:

--(45) **Date of Patent: * May 5, 2009**

( * ) Notice: Subject to any disclaimer, the term of this patent is extended or adjusted under 35 U.S.C. 154(b) by 357 days.

This patent is subject to a terminal disclaimer.--

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,527,868 B2
APPLICATION NO. : 10/354081
DATED : May 5, 2009
INVENTOR(S) : Jean-Michel Grimal et al.

It is certified that error appears in the above-identified patent and that said Letters Patent is hereby corrected as shown below:

This certificate vacates the Certificates of Correction issued July 21, 2009 and August 10, 2010. The certificate is a duplicate of the Certificate of Correction issued June 16, 2009. All requested changes were included in the Certificate of Correction issued June 16, 2009.

Signed and Sealed this

Fourteenth Day of September, 2010

David J. Kappos
*Director of the United States Patent and Trademark Office*